June 28, 1927.
P. J. McINTYRE
1,634,110
RADIATING DEVICE
Filed March 17, 1926
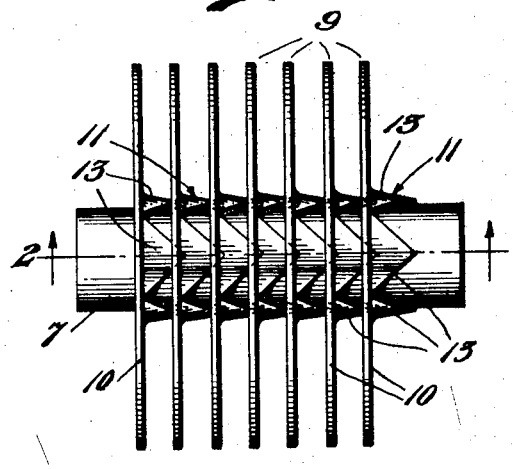
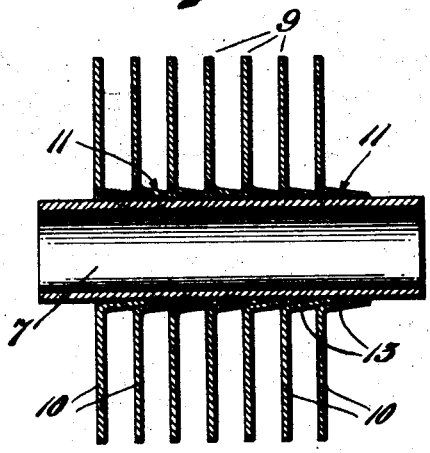
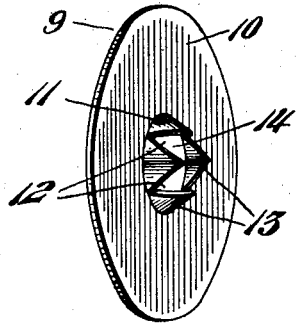
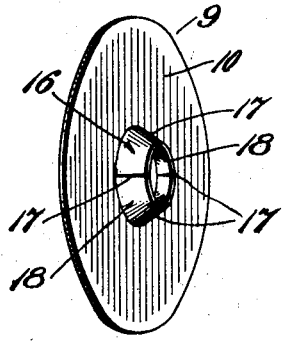
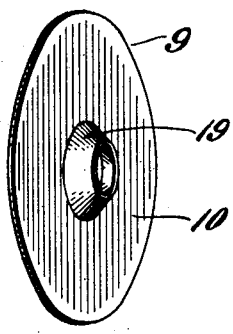
Inventor
Patrick J. McIntyre
By
Horatio E. Bellows
Attorney Patented June 28, 1927.

1,634,110

UNITED STATES PATENT OFFICE.

PATRICK J. McINTYRE, OF DETROIT, MICHIGAN, ASSIGNOR TO WOLVERINE TUBE COMPANY, A CORPORATION OF MICHIGAN.

RADIATING DEVICE.

Application filed March 17, 1926. Serial No. 95,284.

My invention relates to radiator tubing, that is to say tubing intended for radiation in condensers, blowers, refrigerating devices, steam and water heating systems, and other radiators.

Heretofore the conduit or pipe member of the radiator has had mounted upon its exterior radiator fins provided with integral sleeves spaced from each other and embracing the pipe. In order to secure the necessary tightness of the fin sleeves upon the pipe it has heretofore been necessary to employ solder or expand the pipe. The presence of solder interfered with radiation.
The expanding operation was not only expensive but limited the material of the pipe to expandible metal such as copper.

The essential objects of my invention are to secure an intimate union of the sleeves upon the pipe without the employment of solder or expansion, and with the added result that the sleeves will be perfectly tight upon the pipe even when the surface of the latter is irregular; and finally to insure that the fin sleeves be not deranged or detached from the pipe when and if the originally straight pipe be subsequently bent or coiled.

To the above ends essentially my invention consists in such parts and in such combinations of parts, and in such steps, and in such successions of steps as fall within the scope of the appended claims.

In the accompanying drawings which form a part of this specification Figure 1 is a side elevation of a length of radiator pipe equipped with fins constructed and applied according to my invention, Figure 2, a section of the same taken on line 2—2 of Figure 1, Figure 3, a perspective view of a fin before application to the pipe, and Figures 4 and 5, similar views of modified forms of fins before application.
Similar reference characters indicate similar parts throughout the views.

As herein shown 7 is the conduit or pipe of ferrous or nonferrous material. To this pipe is applied the fins, one of which is shown in Figure 3, and represented generally by the reference numeral 9. The fin, which may be of any peripheral shape, is herein shown as circular. It is formed by cutting a circular blank disk or body 10 from a sheet of thin metal preferably steel, brass, or copper with its surface preferably free of solder or other fusible material, and centrally piercing the same and pressing the pierced area laterally or outwardly from the plane of the remainder of the disk to form a trunco conical sleeve 11 provided with inwardly directed angular incisions or cuts 12 forming angular pointed segments 13. The sleeve 11 is, because of its thin metallic wall, resilient or yielding to a certain degree; and before application to the pipe 7 the diameter of the outer end of the tapering sleeve opening 14 somewhat less than the external diameter of the pipe while the diameter of the inner end of the opening is slightly greater than the outer diameter of the pipe.

In assembling the fins 9 upon the pipe 7 they are successively forced longitudinally along the pipe, the latter passing through the openings 14. During this movement the segments 13 of each sleeve 11 expand, their outer ends tightly engaging the pipe surface, while the inner end of the sleeve overlaps the adjacent sleeve and forces the outer end of the latter into tight engagement with the pipe.

By the overlapping relation of the fin sleeves not only are the sleeves tightly bound upon the pipe and upon each other regardless of any irregularity of the pipe surface, but any subsequent bending of the pipe will not force any portion of any sleeve away from the pipe. Furthermore increased radiation is afforded by the overlapping character of the sleeves because by this means the disks are capable of being located closer to each other, and thus the number of fins be increased over any given area. The described structure and method are inexpensive and simple and avoid soldering and mechanical pipe expansion.

In Figure 4 the tapered or conical fin sleeve 16 differs from the sleeve 11 in that the incisions 17 are not angular, and the segments 18 are of different shape.

In Figure 5 the conical fin sleeve 19 is without incision, and not segmental. While this construction of fin sleeve possesses some of the advantages of my invention it does not possess all.

I claim:—

1. In a device of the type set forth, a pipe, and fins having normally tapered sleeves surrounding the pipe and held thereon by friction solely with the sleeves of the fins having their free ends forced one within the other at the posterior end of the next adjacent, said sleeves being slitted to form independent segments whereby the end of one sleeve pinches the ends of the segments of the adjacent sleeve binding the latter tightly onto the pipe.

2. The method of securing fins to a radiator pipe or the like, which consists in forming in the centre of the fin bodies tapering sleeves tapered upon straight lines of less diameter than the exterior diameter of the pipe, and then forcing the sleeves successively upon the pipe and partly over the sleeve of the adjacent fin whereby the inner end of each sleeve clamps the outer end of an adjacent sleeve tightly onto the pipe to additionally secure it thereon, in close fitting contact to hold them immovably in place solely by frictional contact with each other and with the pipe.

In testimony whereof I have affixed my signature.

PATRICK J. McINTYRE.